March 31, 1959
V. F. ZAHODIAKIN
2,879,574
FASTENING DEVICES
Filed Sept. 30, 1955
2 Sheets-Sheet 1
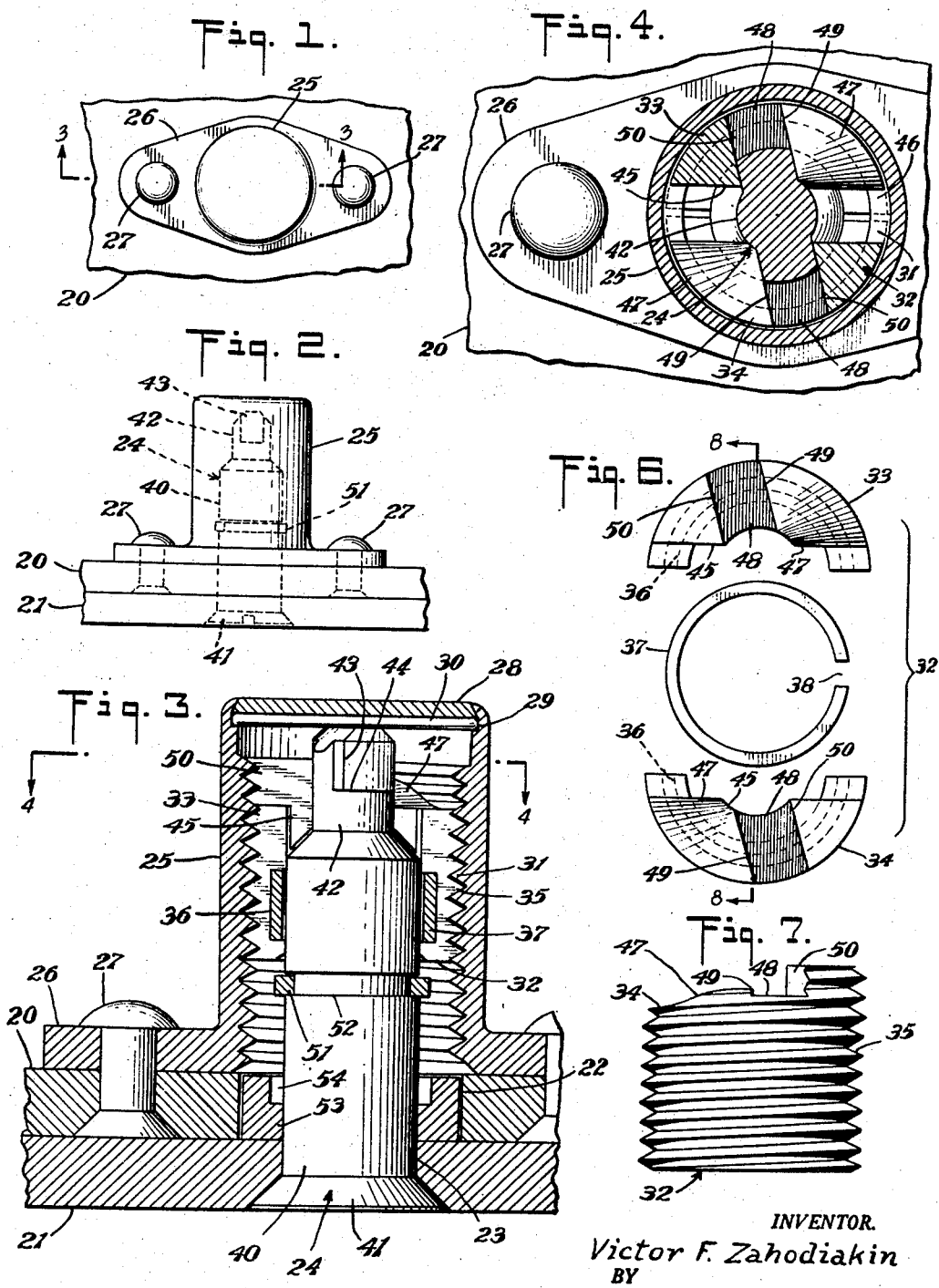
INVENTOR.
Victor F. Zahodiakin
BY
Howard P. King
ATTORNEY.

March 31, 1959 V. F. ZAHODIAKIN 2,879,574
FASTENING DEVICES
Filed Sept. 30, 1955 2 Sheets-Sheet 2
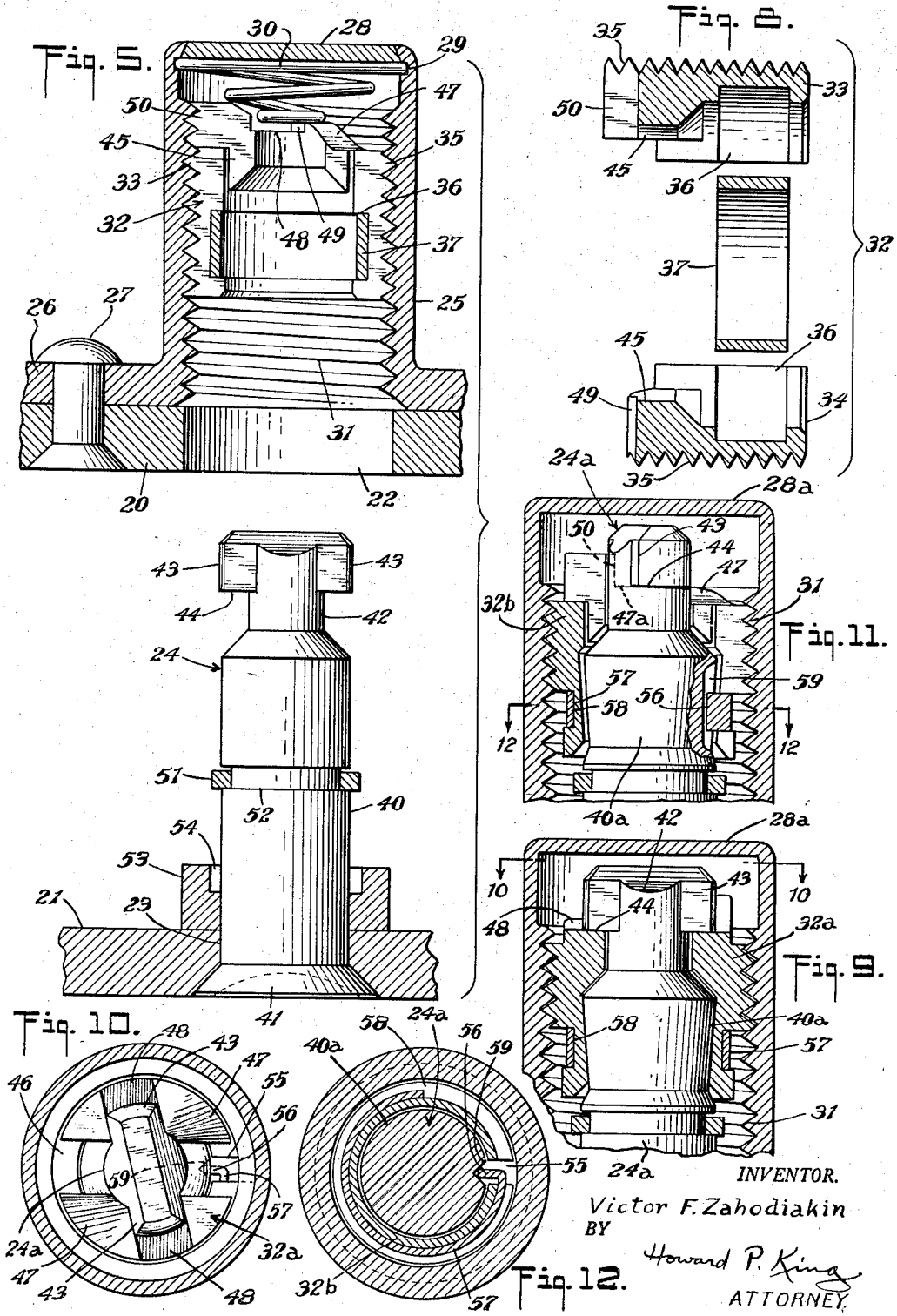
INVENTOR.
Victor F. Zahodiakin
BY
Howard P. King
ATTORNEY.

United States Patent Office

2,879,574
Patented Mar. 31, 1959

2,879,574

FASTENING DEVICES

Victor F. Zahodiakin, Summit, N. J.

Application September 30, 1955, Serial No. 537,662

6 Claims. (Cl. 24—221)

This invention relates to a rotary type fastening device and particularly to the quick-locking stud and socket type wherein clamping is obtained by engaging the stud with the socket by means of rotation of the stud.

There have been many efforts to design stud and socket type fasteners of high strength, but they have not been satisfactory for many reasons, such as, inability to retain constant torque, inability to obtain engagement of the stud in the socket without special effort or force, inability to provide positive locking means which will not depend on compression springs effective on the members being clamped, need for many sizes inclusive of ones difficult to manufacture at a reasonable cost, failure to obtain desirable durability under heavy and excessive loads, and so forth.

Fastening devices of this general character have extensive use in airplane construction, and in a great many commercial applications, such as for securing parts, fuselages, components, brackets, doors, panels and a multiplicity of other members too numerous to be enumerated. It is important to note that in the use of common fastening devices of quick clamping type, a great many sizes are employed due to inability or inaptitude of any given size of fastening device to be used for clamping all of the great variety of thicknesses encountered in members of such diversity as indicated above. Consequently users have to stock a great quantity of various sizes or "numbers" of component parts to adapt the devices for required thickness of material to be fastened together, since normally the prior art devices are each made to accommodate only one specific thickness of members, and not to exceed a tolerance of .030 inch, and therefore, when such members are slightly greater than the thickness specified, a different size of fastener or a component part thereof must be used to accommodate the greater thickness. Similarly, when the thickness is less, a different fastener or component part is required.

A further inherent defect of prior art devices of quick locking type is that they are only able to carry a very limited load in respect to the tensil strength or sheer stresses of the weakest component, and therefore, can be useful only for light applications where no substantial load will be encountered and where ability to carry the load will depend on the strength of the devices. For example, prior art devices when loaded in excess of fifty or seventy-five pounds admit deflection to take place and, therefore, the clamped members are permitted to separate, with the result of undesirable and perhaps tragic consequences or damage, particularly in the use of the devices in aircraft. This deflection will generate vibration and finally breakage of such devices due to crystallization of component parts of such fastening devices, and the clamped members become unfastened and separated, and when this occurs with outside plates or other vital parts of an aircraft in flight, the consequences may be tragic as unfortunately taught by accidents of record.

It is furthermore a well known fact that prior art quick locking fastening devices have no provision to compensate for wear and experience has proven that when the wear exceeds certain limitations those devices, sometimes very quickly, have become totally ineffective. Almost invariably quick locking devices of the prior art depend on coil springs or flat sheet steel springs to provide tension for clamping by the device, and when the load exceeds the spring tension repetitiously in rapid succession, deflection and vibration occur in the members being clamped and in the components of the device. It is a well known fact deflection and vibration in metal causes crystallization thereof, especially in metal that has been heat treated, and cracked members and fractured devices have resulted in use. It is also a fact that heat treatment is required in the fabrication of springs, and where permissible maximum hardness are exceeded, as sometime occurs, the springs are embrittled and consequently break in use and result in the device becoming ineffective.

The large discrepancy between the permissible hardness of the springs of the prior art devices and the surfaces against which they have bearing has presented a difficult problem. The bearing surfaces can be and most desirably are case carburized and hardened, but the springs cannot be so hardened and consequently are subject to rapid wear where constantly rubbing on the case carburized hardened surface and the spring becomes increasingly ineffective as a result.

Broadly considered, the invention proposes a construction that will overcome the above-recited and other defects, short-comings and problems of the prior art.

An overall object of the invention is to effect a solid clamping by a device wherein no deflection is permitted within the device when in its clamping condition.

The invention also contemplates provision of a device in which lateral movement of clamped members under sheer load is prevented within higher limits than heretofore attained by prior art devices.

Closely related to the foregoing objects is one proposing a structure which will not be released or opened by any adverse force encountered in use, such as vibration, heavy loads, sheer, or other stresses.

Viewed further in its broad aspect, the invention contemplates the provision of a fastening device which will be readily applicable and of universal character.

Apropos to the foregoing object is the purpose to provide an improved fastening device which will accommodate and be readily adjustable to clamp a varying number and/or thicknesses of members to be clamped together.

An essential object of the invention is to provide a fastening device which avoids interposing a load-supporting spring between the gripping means and the members being clamped, or, in other words, one which avoids loading a spring with the load carried by the fastening device.

Another object of the invention is to provide a fastening device in which constituent components are held tightly under high tension thereby preventing said components from oscillating between themselves, and thereby eliminating usual wear prevalent in prior art devices.

More specifically the invention proposes a high strength fastening device the component parts whereof become in effect like one solid mass of metal in which no movement, vibration or wear is possible when set to clamping position.

Another object of the invention is to provide a fastening device of high strength and which will accomplish tight clamping but is conveniently operated and requires no special tools for installation and use and is readily applied and released when desired in the field.

Yet another object of the invention is to provide for a constant rotational torque and frictional retention of the stud in applying and removing the same.

In addition to fundamental objectives referred to above and having in mind the foregoing and other drawbacks and deficiencies of the prior art, it may be broadly stated that the present invention proposes construction of a fastening device of totally new character and design.

Still further objects, advantages and results will become evident to persons skilled in the art to which the invention appertains, as the description proceeds, both by direct recitation thereof and by implication from the context.

Referring to the accompanying drawing in which like numerals of reference indicate similar parts throughout the several views;

Figure 1 is a plan of the fastening device applied to a member being clamped;

Figure 2 is an elevation of the same;

Figure 3 is a vertical sectional view on line 3—3 of Fig. 1;

Figure 4 is a cross-sectional view on line 4—4 of Fig. 3;

Figure 5 is a vertical sectional view corresponding to Fig. 3, but showing the stud withdrawn from or in position to enter the socket;

Figure 6 is an exploded plan of a preferred form of expansible nut;

Figure 7 is an elevation of one segment of said nut;

Figure 8 is a sectional view of the exploded nut of Fig. 6, taken on line 8—8 thereof;

Figures 9 and 11 are vertical sections taken on planes at right angles to each other, and showing each a different modified construction and both using an inherently expansible resilient nut and a tapered stud;

Figure 10 is a cross-section on line 10—10 of Fig. 9; and

Figure 12 is a cross section on line 12—12 of Fig. 11.

In the specific embodiment of the invention illustrated in said drawings, the reference numerals 20, 21 designate two members adapted to be juxtaposed and clamped together by the fastening device of the present invention. These members are representative of any number and thickness of bodies to be clamped together. Said members have holes 22, 23 therein adapted to register axially with each other and intended to receive a stud 24 (or 24a of Figs. 9 to 12) more fully described hereinafter.

The fastening device comprises, as part of the socket portion thereof, a fixed cylinder 25 having a bore substantially the same diameter as, and in registration with hole 22 of adjacent member 20. Said cylinder has an external flange 26 at its end next to said member 20, said flange being riveted, as at 27, to said adjacent member. The end of said cylinder toward member 20 is open, whereas the other end is closed, and in Figures 3 and 5 the closure is shown effected by means of a disc 28 held in place by spinning the rim of the cylinder over the edge of said disc. In Figures 9 and 11, the end closure 28a is shown as integral with the side wall of said cylinder. The advantage of use of closure disc 28 is that a retaining groove 29 may be readily cut before the end is closed and a conical spring 30 seated with its largest convolution in the groove, and thus, when the disc is applied, be retained as a permanent part of the socket element. The advantage of use of a spring of cone shape, is that it may be compressed to the thickness of a single convolution and thus minimize the required over-all length of the socket element. The interior of the side wall of cylinder 25 is screw threaded from the open end upwardly into proximity to the closed end by V-shaped or otherwise tapered threads 31, the pitch diameter whereof is uniform and predetermined.

Within said cylinder 25 is an expandable nut, designated in Figs. 3 to 8 by reference numeral 32, in Figs. 9 and 10 by numeral 32a and in Figs. 11 and 12 by numeral 32b. The nut 32 of Figs. 3 to 8 is split on a longitudinal-diametric plane, thereby introducing a discontinuity dividing the nut into two complimentary semi-cylindrical segments 33, 34. When these segments are assembled in their natural relation, they form a substantially cylindrical body and that body is screw-threaded on its exterior with threads 35 corresponding substantially in shape and size with the threads 31 of fixed cylinder 25, enabling the body to be screwed into said cylinder where it remains permanently, unless, perchance, some need arises for its replacement. Said nut body is hollow, having a cylindrical bore throughout the lower part thereof, and within said body is an interior annular groove 36 opening into and providing thereat an enlargement of the bore. In said groove is located a split circular band spring 37 which tends to force the segments apart radially. The split 38 of said spring is large enough to permit the segments to be resiliently compressed toward each other to engage the stud shank without closing together on their longitudinal-diametric dividing plane. The expansive spring tension applied to the segments introduces a constant friction between the threads and the torque of rotation of the nut will be constant for all locations of the nut in the cylinder. By virtue of presence of spring 37 between the segments 33, 34, the pitch diameter of the threads thereon before assembly in the socket element will be greater than the pitch diameter of the threads of said socket element. The nut is made of steel and case carburized to obtain maximum surface hardness.

The fastening device includes a stud element 24 which is shown in Figs. 2 to 5 as having a stout cylindrical shank 40 at one end of which is a head 41 and at the other end of which is a coaxial reduced neck 42 from which project lateral protuberances or lugs 43 diametrically opposite to one another. The top edges of the protuberances and the top end of the stud neck are shown at the same level and are chamfered all around so that the stud may be readily introduced through the socket element and its nut. The under edges of the protuberances or lugs are formed as flat shoulders 44 in a common plane perpendicular to the axis of the shank and neck. The side faces of the protuberances are parallel to each other and are perpendicular to said shoulders and plane thereof, the distance between said parallel faces being herein referred to as the width of said protuberances, and the projection radially from the surface of the neck to the outer ends of said protuberances is referred to as the length thereof. The distances of projection of said protuberances from the axis to their outer ends are substantially equal to the radius of shank 40 so that the protuberances will pass through the same hole 23 in member 21 which is of proper diameter to slidably receive said shank. Clamping of members 20, 21 is obtained by the head 41 of the stud underlying member 21 marginally of hole 23 while cylinder 25 presses down upon the other member 20 due to force exerted by nut 32 (32a or 32b) being screwed upwardly in the cylinder and into engagement with shoulders 44 of protuberances 43. Said stud, inclusive of the protuberances, is made of steel and case carburized to obtain maximum strength and hardness, and also being of stout character, very heavy loads may be applied without rupturing said stud.

In order that the protuberances may be inserted through the nut and yet make overlying contact therewith, each segment is flanged inwardly proximate to the top end providing a collar section 45 chordally of the bore which accommodates the shank, said collar sections each being hollowed appropriately to accommodate and substantially fit against the neck portion of the stud. As an extensive part of said collar section is chordal and parallel to the plane of division between the segments, a double keyhole slot 46 is thereby provided through the top end of the assembled nut of appropriate size and shape to admit passage of the protuberances and associated portion of the neck therethrough. After the protuberances are thus inserted to the upper side of the nut, the stud can be rotated clockwise with respect to the nut to turn the protuberances to a location overlying the collar composed of said collar sections.

The top surface of the nut, in said clockwise direction from the keyhole slot, provides inclined cam surfaces 47 up which the protuberance shoulders 44 ride as the stud is partially turned. The upper or far end of the cam surface, or a horizontal flat extension therefrom, ends abruptly at a declivity 48 into which the respective protuberances will fall, aided in the construction of Figs. 1 to 8 by conical spring 30, the smallest convolution of which engages at the end of said stud. The wall 49 of the declivity 48 that terminates the cam surface is relatively low, being equivalent to perhaps half or less thread turn of the nut. However, the other wall of said declivity is relatively high, substantially commensurate with the axial height of the protuberances and intended to form a barrier 50 to passage of the protuberance therebeyond and to constitute driving means for clockwise rotation of the nut when the protuberance is rotated into engagement therewith and rotation continued. The low wall 49 and barrier wall 50 of each segment are parallel to each other and perpendicular to the bottom wall of the declivity, said bottom wall being in a plane perpendicular to the axis of the nut so that the protuberance shoulders 44 will seat flatwise thereon with full surface contact. Furthermore, said low wall 49 and barrier wall 50 are spaced from each other a distance substantially equal to the thickness, as above described, of the protuberance, which enables the protuberance to nest with appropriate fit in the declivity and thereby positively lock or unify the stud and nut for rotational purposes. While it is obvious that the barrier wall constitutes driving means for clockwise rotation of the nut, it may also be observed that the low wall 49 constitutes driving means for partial anti-clockwise rotation of said nut by the stud.

As the threads on the nut are what are known as right-hand threads, clockwise rotation of the stud and nut as a unit will advance the nut on its threads so the nut moves in an axial direction on the stud away from the stud head and toward the protuberances. The result is that the nut exerts a longitudinal force upwardly as to the stud and downwardly as to the cylinder and clamps the members 20, 21 tightly together. More than that, the tightening of the nut in clamping position forces the lower facets of threads 35 of the nut against the upper facets of the threads 31 of the cylinder, eliminating all clearance between said facets, and as those facets taper, a radial moment of force is exerted which tends to shrink the nut, and which it actually does since the nut has a discontinuity by being split or segmental, and with the split adequate to accommodate the desired shrinkage in diameter of said nut. Obviously circular band spring 37 will yield to the pressure and the inside bore surfaces of the nut will be squeezed with great force against the stud shank 40, which produces the effect of solidarity from the cylinder 25 to the stud through the nut in high compression engagement with both. The interengaging threads provide a large surface area for supporting the load, and the tenacious grip obtained by the nut on the shank serves to transfer the load from the stud to the cylinder through this connection without having to rely completely upon the sheer strength of the protuberances.

To release the fastening device, the stud is rotated in a counter-clockwise direction. As the protuberances are seated in the declivities 48 of the nut and engage against the low wall 49 thereof, rotation of the stud initially also rotates the nut which thereupon feeds downwardly on its threads until it is low enough for the protuberances to pass over said low walls onto the cam surfaces 47. Further rotation of the stud anti-clockwise results in the protuberances riding down the cam surfaces 47 into registration with keyhole slot 46 which they enter under influence of conical spring 30, whereupon the stud may be withdrawn from the socket as shown in Fig. 5, and the members separated. The stud is kept assembled with member 21 by means of a snap ring 51 applied around the stud shank in a peripheral groove 52 prepared for the purpose. A steel washer 53 is shown on the stud of appropriate size to fill the hole 22 of member 20, and this washer may be recessed, as at 54, to accommodate snap ring 51 to permit maximum withdrawal of the stud through member 21 prior to insertion of the protuberances into the keyhole slot and permit the members 20, 21 to be juxtaposed without having to first register the protuberances and keyhole slots of the several fastening members used with such members.

Instead of having the discontinuity of the nut diametric, thereby producing fully separable segments 33, 34 as above described, the discontinuity may be only radial at one side of the nut, as illustrated in Figs. 9 to 12. Such a nut 32a in Figs. 9 and 10 and 32b in Figs. 11 and 12, which is made of high carbon steel, is first split and expanded, and then heat treated to generate resiliency, and in expanded condition has a greater pitch diameter than the threads of the cylinder. By virtue of this construction, said nut 32a or 32b may be resiliently squeezed for insertion into the cylinder and further squeezed in use by the taper of the threads and thereby obtain the aforesaid tenacious frictional engagement with the stud shank for gripping the shank to carry the load supplemental to or entirely in replacement of carrying the load by the protuberances. Where only a single discontinuity, best shown at 55 in Figs. 10 and 12, is employed, the nut also functions as an expanding spring for itself, and inclusion of a separate band spring 38 described in connection with the prior figures, is unnecessary.

To improve the tenacity of grip of the nut upon the stud, I have shown in the construction of Figures 9 to 12 gripping surfaces for the shank 40a and nut 32a as correspondingly frusto-conical. The larger diameter of the frusto-conical surface is upward of the nut and stud, whereas the smaller diameter is downward. Furthermore, the larger of these diameters for the shank is no greater than the normal smaller inner diameter of the nut, so that, before the nut is squeezed, the stud may be introduced thereinto, but when the nut is squeezed in use, the downwardly converging slope of the nut bore supports the upwardly flaring or diverging shank surface. In this way, the entire load may be carried by the interengaging frusto-conical surfaces, applying it directly to the stud rather than having to carry the load on the protuberances, and in view of the very much greater strength of the stud shank and extensive screw surfaces, far greater loads can be carried than could possibly be carried directly on the protuberances.

The showing of Figure 11 omits inclusion of a declivity, but instead, the inclined cam surface 47 has a horizontal extension 47a, in a plane perpendicular to the axis, which extends to and terminates at the barrier 50. While the retention of the nut in fixed relation to the stud will be obtained by the gripping action imposed by contraction of the nut under influence of the pressure of the threads of the nut and cylinder, a supplemental retaining means may be provided, as by detent 56, which is also included in the showing of Figures 10 to 12, wherein the stud and nut have frusto-conical interengagement and also have the aforedescribed declivity.

Although highly unlikely, yet on some occasions it might happen that the protuberance shoulder does not seat properly or interlock in the declivity provided for it in the top of the nut, and as a safety measure the detent 56 above mentioned may be provided for supplemental locking. Said detent in Figs. 10 to 12 as well as in Fig. 9, is shown as the radially inwardly directed end of a generally circular leaf spring 57 carried in a peripheral groove 58 at the outside of a reduced portion of nut 32a, Figs. 9, 10, or 32b, Figs. 11, 12 said detent projecting through the discontinuity of the nut into a notch 59 in the side of the stud. The parts are so constructed that the detent will snap into said notch when the stud and nut have a relative tightly locked location which in Figs. 9 and 10 occurs when the protuberances are in registration with the declivity. In either construction, the notch is long enough in a direction lengthwise of the stud to be engaged by the detent without being critical as to height on the stud. At least the operator may hear or feel the clock and will known that the stud and nut are in proper rotative relation.

The constructions which are described above lend themselves to the socket element being heat treated when to be used with a segmental nut, and to be case carburized and hardened when to be used with a single split resilient nut. Since the stud, nut and cylinder are locked in very tight gripping engagement, there will be no vibration effective therebetween, and thus the cause of wear so prevalent in prior art devices is totally eliminated. Also the sheer load applied to the present device is spread over extensive lengths and surfaces, and because of this greater strength far greater loads can be carried by the device of this invention. This qualification of resistance to sheer loads is of great and paramount importance where large stresses are involved and applied rapidly or with impacts, as these conditions occur constantly in use and construction of present day high speed aircraft and the loads have attained such magnitude that requirements imposed on the fastening devices cannot be met by any known type or design of fastening devices of present-day manufacture which absorb or carry the load by inclusion of a spring. Also, since no spring is used in the present invention to carry any part of the load, inability to harden springs or loss of temper in springs from heat no longer enter as limitations of manufacture or use. Furthermore it may be pointed out that even though repeated opening and closing the device of this invention may result in wear occurring in the threads of the cylinder and nut, yet the expansibility and resilient outward pressure of the nut toward the cylinder keeps the threads interengaged and maintains a constant torque of rotation therefor. It also is not amiss to point out that the fastening device of this invention is fabricated from few and simple parts and is readily assembled, all of which tends toward economical manufacture and simplicity of replacement in the field. As the cylinder has a threaded length much longer than the nut, the device is capable of use with an equally great variation in number and/or thickness of members clamped.

It is believed to be clear from the above, that the nut can be locked at any position within the socket element to which it is adjusted, up or down, agreeable to the number or thicknesses of members being clamped, and the stud can be rotated with a screw driver to both bring the nut to its proper adjusted position and to lock and unlock the nut from its engagement with the stud. Normally, in use, the unlocking is effected by the anti-clockwise rotation of the nut by the initial engagement of the protuberances with the low wall of the declivity, and after it has passed over that wall no further rotation of the nut is necessary and the protuberances pass downwardly of the cam surfaces and then cut through the key-hole slot. However, if an adjustment of the nut is desired downwardly of the socket element, the operator, after releasing the protuberances from engagement with the declivity can continue to press on his screw driver while rotated into engagement with the back side of barrier 50 and thereby cause the nut to be further rotated anti-clockwise and feed in a direction toward the open end of the socket element as far as the operator wishes to move it. Release of pressure by the operator on the screw driver will then permit the stud to be removed by withdrawal from the key-hole slot and will leave the nut in its newly adjusted position. To clamp the stud again at its new position with the added members, the stud is inserted as usual and if there is too much slack, it is taken up merely by screwing the stud clockwise and rotating the nut by engagement of the protuberances with the barrier until the protuberances reach the declivities which they will enter and become locked in as heretofore described.

I claim:

1. A fastening device comprising a stud and a socket element for receiving the same and between which a load may be applied, a contractable nut interposed between said stud and socket element, said nut and stud having frusto-conical interengaging surfaces, means for rotating said nut, and means for contracting said nut into gripping engagement with said stud at said frusto-conical surfaces.

2. A fastening device comprising a stud and a socket element internally screw threaded, a nut having external threads engageable with said internal threads rendering said nut movable longitudinally of the socket element by rotation therein, said nut having a passageway therethrough and said stud having protuberances insertable through said passageway, and said nut having parallel walls beyond said passageway of which the wall nearest said passageway in a permitted rotative direction is lower than the more distant of said walls, and a cam surface leading upward to the top edge of said lower wall.

3. A fastening device comprising a stud having a stout body and a coaxial neck at the upper end thereof, said neck having a less diameter than said body, and protuberances projecting radially and opposite to each other from said neck and each having a bottom flat shoulder and parallel side faces perpendicular to said shoulder, and a nut having a hollow adapted to receive the stout body therein and having a passageway through which said protuberances and associated portion of said neck may be passed, and the upper end of said nut having declivities rotatively offset from said passageway, said decivities each having side walls the spacing whereof is substantially the same as the spacing between side faces of said protuberances and said side walls of each declivity being parallel, and a cam surface on the top of said nut leading from said passageway to the top of one of said parallel walls of said declivity.

4. A fastening device comprising a stud and a socket element, said stud having a shank constituted in part as a body of revolution insertable into said socket element, said socket element having internal screw threads therein, a nut having exterior screw threads engageable with said internal screw threads of the socket element, said nut being of less length than said socket element and insertable in its entirety in said socket element, said stud being insertable through said nut while said nut is in place entirely within said socket element and entirely removable from said nut with the nut remaining in the socket element, said nut and stud having interengaging means for rotation of the nut by rotation of said stud, said interengaging means being releasable for withdrawal of the stud from said nut and socket element with said nut remaining assembled in place entirely within said socket element, and said nut having a peripheral discontinuity enabling said nut to be contracted into gripping engagement with said part of the stud constituted as a body of revolution upon tightening the stud and nut in said socket element.

5. A fastening device comprising a stud and a socket element, said stud having a shank constituted in part as a body of revolution and insertable into said socket element, said socket element having internal screw threads therein, a nut having exterior screw threads engageable with said internal screw threads of the socket element, said nut being of less length than said socket element and insertable in its entirety in said socket element, said stud being insertable through said nut while said nut is in place entirely within said socket element and entirely removable from said nut with the nut remaining in the socket element, said nut and stud having interengaging means for rotation of the nut by rotation of said stud, said interengaging means being releasable for withdrawal of the stud from said nut and socket element with said nut remaining assembled in place entirely within said socket element, said nut having a peripheral discontinuity enabling said nut to be contracted into gripping engagement with said part of the stud constituted as a body of revolution upon tightening the stud and nut in said socket element, said nut having an interior circumferential groove therein, and a split circular band spring embedded in its entirety in said groove and exerting expanding pressure on said nut and freely passing said stud therethrough.

6. A fastening device comprising a stud and a socket element, said stud having a shank constituted in part as a body of revolution insertable into said socket element, said socket element having internal screw threads therein, a two-piece nut divided as semicylindrical segments movable both longitudinally and radially with respect to each other, both segments of said nut having exterior screw threads engageable with said internal screw threads of the socket element, said nut being of less length than said socket element and insertable in its entirety in said socket element, said stud being insertable through said nut while said nut is in place entirely within said socket element and entirely removable from said nut with the nut remaining in the socket element, said nut and stud having interengaging means for rotation of the nut by rotation of said stud, said interengaging means being releasable for withdrawal of the stud from said nut and socket element with the nut assembled in place entirely within said socket element, said nut having an interior circumferential groove therein, and a split circular band spring embedded in its entirety in said groove and exerting expanding pressure on said nut segments and freely passing said stud therethrough.

References Cited in the file of this patent
UNITED STATES PATENTS

| | | |
|---|---|---|
| 919,913 | Miller | Apr. 27, 1909 |
| 922,690 | Frankel | May 25, 1909 |
| 2,318,415 | Patzschke et al. | May 4, 1943 |
| 2,388,273 | Lord | Nov. 6, 1945 |
| 2,486,411 | Huelster | Nov. 1, 1949 |
| 2,514,113 | Zahodiakin | July 4, 1950 |
| 2,517,364 | Torresen | Aug. 1, 1950 |
| 2,684,516 | Zahodiakin | July 27, 1954 |
| 2,757,429 | Summers | Aug. 7, 1956 |